United States Patent [19]

Bates

[11] Patent Number: 4,603,356

[45] Date of Patent: Jul. 29, 1986

[54] IMAGING SYSTEM WITH LIGHT VALVE AND PHOTODETECTOR

[75] Inventor: Richard D. Bates, Ann Arbor, Mich.

[73] Assignee: Energy Conversion Devices, Inc., Troy, Mich.

[21] Appl. No.: 590,941

[22] Filed: Mar. 19, 1984

[51] Int. Cl.[4] .............................................. H04N 5/225
[52] U.S. Cl. .................................. 358/225; 358/213; 250/578
[58] Field of Search ................ 250/578; 358/225, 209, 358/213; 350/333, 342, 345, 357

[56] References Cited

U.S. PATENT DOCUMENTS

| | | | |
|---|---|---|---|
| 4,198,647 | 4/1980 | Grinberg et al. | 357/30 |
| 4,224,615 | 9/1980 | Penz | 340/712 |
| 4,228,449 | 10/1980 | Braatz | 357/30 |
| 4,277,145 | 7/1981 | Hareng et al. | 350/351 |
| 4,345,248 | 8/1982 | Togashi et al. | 340/784 |
| 4,449,153 | 5/1984 | Tschang | 250/578 |
| 4,481,510 | 11/1984 | Hareng et al. | 250/578 |
| 4,516,032 | 5/1985 | Barr | 250/578 |
| 4,534,622 | 8/1985 | Harada et al. | 350/333 |

FOREIGN PATENT DOCUMENTS 1140791  6/1976  Canada .

OTHER PUBLICATIONS

G. W. Taylor, "Feasibility of Electro-Optic Devices Using Bismuth Titanate", Proc. IEEE, vol. 58(8), pp. 1220-1229 (1970).

Primary Examiner—Gene Z. Rubinson
Assistant Examiner—Stephen Brinich
Attorney, Agent, or Firm—Richard M. Goldman

[57] ABSTRACT

Disclosed is an image detection system having a photodetector, e.g. a photovoltaic cell, a photoconductor sheet, and a means, e.g., a liquid crystal light valve or an electrochromic light valve, matrix light valve having a plurality of individually addressable light valve cells. The image detection system also has means to identify the signal generated by the photodetector with the individual light cell switched to a light transmissive mode. Also disclosed is a method of detecting and updating an image using the image detection system.

42 Claims, 5 Drawing Figures

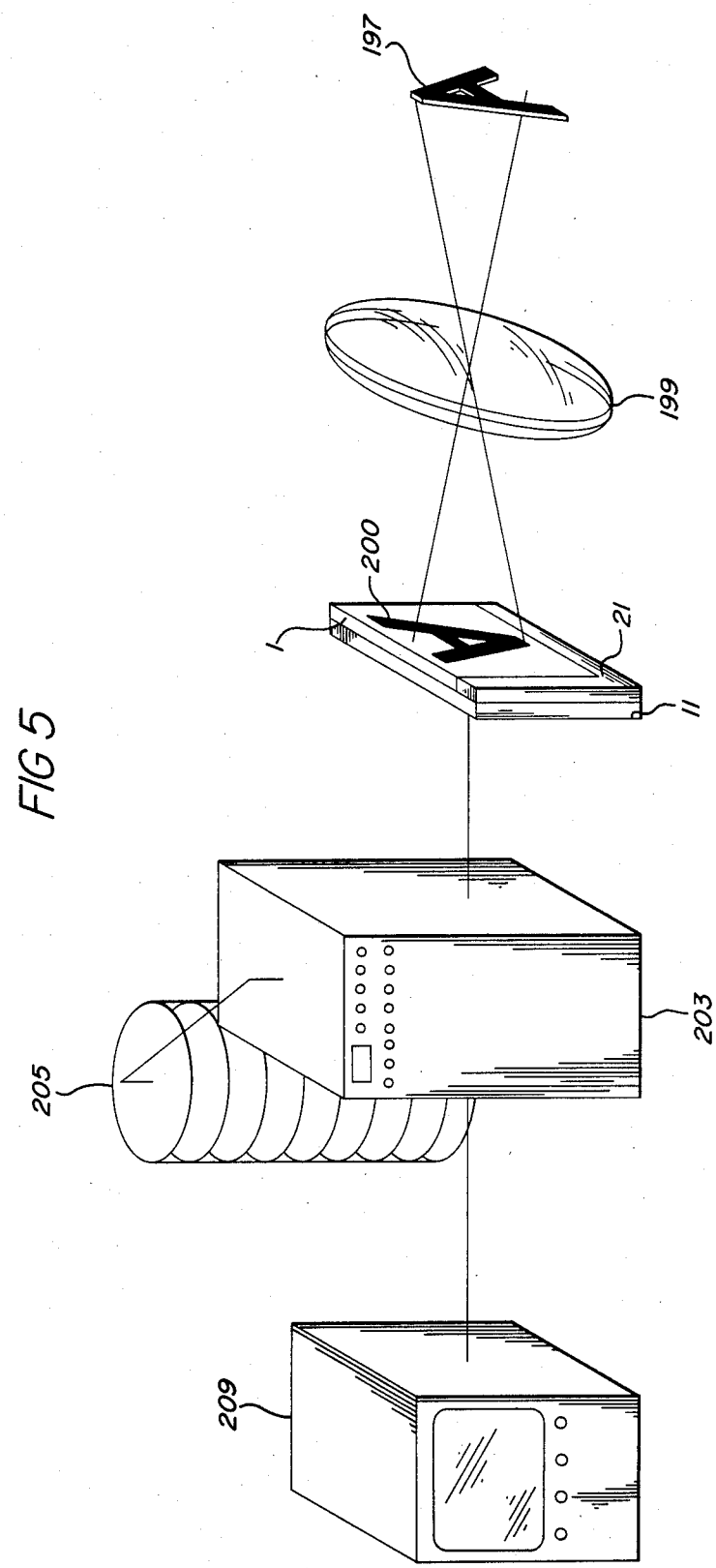

IMAGING SYSTEM WITH LIGHT VALVE AND PHOTODETECTOR

FIELD OF THE INVENTION

The invention herein relates to an imaging system formed of (1) photodetector means for generating a signal responsive to light incident thereon and (2) volatile, light valve selective scanning means for passing incident light therethrough to the photodetector means. More particularly, the invention relates to imaging systems, optical image recording systems, optical image amplification systems, updatable data entry systems, photographic systems, and applications thereof encompassing photodetector means and light valve means.

The present invention allows imaging systems to be formed in a compact unit having a high packing density of resolution elements per unit area thereby providing high resolution. Moreover, the present invention allows a relatively small number of manufacturing steps to be utilized for the manufacture of the imaging system.

BACKGROUND OF THE INVENTION

Electron beam scanning imaging is a commercial method of generating electronic images. In electron beam scanning imaging systems, an electron beam scans a charge pattern on a target, for example, a photoconductor or photoemissive target. The particular point being scanned on a target is discharged, the degree of discharge indicating the intensity of the image.

In the Zworkin Iconoscope, a high energy electron beam scanned a photoemissive, insulating target, emitting a low energy secondary electron or electrons. The Zworkin Iconoscope was followed by the Image Iconoscope and the Superemitron.

In the Image Iconoscope and the Superemitron, the image was focused upon a semitransparent, conducting photocathode whereby to emit secondary electrons. These secondary electrons, that is, photoelectrons, were focused on an insulating target. The insulating target was scanned with high energy electrons.

The Image Iconoscope and the Superemitron were followed by the Image Orthocon where the image was focused on a photocathode which emitted secondary electrons to one side of a two sided target screen. The reverse side of the two sided target screen was scanned by low energy electrons. The Image Orthocon was replaced by the Image Isocon and thereafter by the Vidicon. In the Vidicon, the image was formed by positive charges on a photoconductor target. The thusly formed positive charges were discharged by the scanning electron beam and the image signal taken out at the target. In this way, a narrow electron beam was utilized to provide high resolution.

One problem with electron scanned imaging systems is the size, including volume and weight, of the tube. Another problem with electron scanned imaging systems is the complex electronic circuit needed to guide the electron beam.

Alternative methods of image detection and formation are the solid state, self-scanned array and the charge coupled device. Typically, self-scanned arrays are crystalline or polycrystalline mosaic sensors which operate by switching rather than by moving an electron beam.

The solid state self-scanning arrays contain an array of photosensitive elements. Each element is at an intersection of mutually perpendicular address buses. The entire array is exposed to incident light, and the photosensitive elements are scanned sequentially or in parallel by an addressing circuit rather than by a moving electron beam. Various circuit elements may be used to provide the necessary array of photosensitive elements and switching elements. For example, the combination of photoactive element and switching element may be a photoconductor and diode, a photodiode and diode, a phototransistor, on a photodiode and field effect transistor. In one mode of operation a photoconductor charges a capacitor and the addressing circuit discharges the capacitor, the current on discharge being a function of the intensity of light falling at the intersection.

Charge coupled devices depend on the collective transfer of mobile electric charge stored in semiconductor storage elements. The electric charge is in the form of electrons generated by the Einstein photoelectric effect. The collective transfer occurs in a serial or "bucket brigade" manner under the control of a clock pulse. The clock pulse forms and displaces a potential well of positive charge. The displacement of the potential well by the clock pulse causes photoelectrically agenerated electrons to move from individual cell to individual cell.

Charge coupled device imaging is carried out by holding the potential wells stationary during an integration period. During this integration period electrons are photoelectrically generated in each photosensor cell. Each photosensor cell has a charge coupled device shift register cell associated with it. At the end of the integration period all of the charge stored in the photosensor cells is transferred to the shift register cells associated therewith, and another integration period is started. Meanwhile, the charge in each charge coupled device shift register cell is read out in serial or bucket brigade manner under the control of the clock, thereby generating a video signal.

Self-scanned solid state arrays and charge coupled devices suffer from the problems inherent in crystalline semiconductor technology, i.e. the maximum size of the sensor is limited by the limtations on epitaxily grown semiconductors and the problems inherent in a multiplicity of photolithographic steps necessary to fabricate the solid state devices.

SUMMARY OF THE INVENTION

It has now been found that a sensor may be provided by a light valve matrix means optically and operatively in series with a photodetector. The sensor has a large number of light valve resolution elements per unit area, for example, in excess of one resolution element per square millimeter, preferably in excess of ten or more elements per square millimeter, and even up to thirty elements per square millimeter. The image detection means herein contemplated is characterized by an addressable, volatile matrix light valve optically in series with a photodetector means between the photodetector means and the incident light or image to be detected. The photodetector generates a signal responsive to light incident thereon passing through the light valve.

The matrix light valve means has a plurality of individually matrix addressable, volatile light valve cells per photodetector whereby to provide a plurality of resolution elements per photodetector. The light valve means is interposed between the image to be scanned and the photodetector means. Exemplary switchable, volatile light valve means include liquid crystal means and electrochormic means. In the image detection means herein contemplated, the photodetector has a lower image resolution than the light valve means in combination therewith, that is the photodetector means has a higher surface area then the individual light valves.

The image detection means herein contemplated is also characterized by having or being used in combination with a means for encoding the signal generated by the photodetector means versus the address of the transmissive individual liquid crystal cell associated with the photodetector signal.

The invention herein contemplated also includes a method of detecting, sensing, and otherwise processing an image by a method including forming the image in proximity to the matrix light valve means, selectively passing light through an individual resolution element of the matrix light valve means to the photodetector means, generating an electrical signal responsive to the light passing through the individual resolution element, switching the individual resolution element to a dispersive or opaque state, and thereafter passing light through another individual resolution element of the light valve means.

According to the method herein, individually addressable light valve cells of the light valve matrix are normally maintained in a light dispersive or light blocking state but individual cells are sequentially switched from the light dispersive or light blocking state to a light transmissive state to permit passage of light therethrough. This results in the generation of a signal responsive to the transmitted light impinging on the photodetector means. The signal is encoded by a timing pulse versus the address of the switched, individual light transmissive light valve cell. Thereafter the light valve cell is switched from the light transmissive state to a light dispersive or light blocking state and a subsequent cell is switched to a light transmissive state.

The apparatus and method herein contemplated are useful in contact sensing, that is where the object image to be formed is on, in contact with, or in fiber optic communication with the imaging means. Alternatively, the apparatus and method herein contemplated are useful in projection sensing, that is where the object whose image is to be formed is remote from the imaging means but the image thereof is focused on the surface of the imaging means.

Alternatively, the imaging means and method herein contemplated may be used as an input device where light pen means are in contact with or in focus on the a surface of imaging means. The apparatus and method may also be used for x-ray imaging where radioluminescent means are in contact with, deposited on, in fiberoptic contact with, or in focus on the surface of the liquid crystal light valve means. According to a still further exemplification, the imaging means herein contemplated may be used as part of a photographic system as a still photographic system or a motion picture photographic system such as a television system.

According to a still further exemplification, the light valve matrix may be periodically switched between a light valve mode of operation and a display mode of operation. For example, the matrix may be switched from a light valve and photodetector mode to a display mode to display the information stored in the system, subsequently switched to the light valve and photodetector mode to input data, and thereafter switched back to a display mode to display the newly inputted data. According to a still further embodiment of this exemplification, input can be by way of a light pen, pen, pencil, felt-tip marker, chalk or the like, illuminating, in focus on, or in contact with the surface of the light valve matrix.

The output of the imaging means may be digital, that is discrete levels, such as 0 or 1, positive or negative, or the like. When the output is digital, the output corresponds to the resolution elements which are in one state and to those which are in a complimentary state referred to in the photoelectric art as light and dark states.

Alternatively, the output can be analog, that is the output can correspond to shades of gray where the output is measured on a scale, such as a linear scale or a logarithmic scale. The analog output can be proportional to intensities of additive primary colors, or to intensities of subtractive primary colors, or to both color intensity and shades of gray.

The invention herein contemplated encompasses an integrated imaging system formed of light valve cell and a photodetector, for example, a photovoltaic cell, with the light valve cell between the photovoltaic cell and the light source or object to be imaged. The imaging system is integrated in that a plurality of individual light valve cells are arrayed in side by side relationship in juxtaposed relation to a photovoltaic cell or other photodetector means.

The photodetector means may be a single photodetector cell for generating a signal responsive to the light incident thereon, extending under the entire area of the image detection means. Alternatively, the photodetector means may be a plurality of individual photodetector elements for generating individual signals responsive to the incident light thereon, each individual photodetector means having a plurality of individually switchable light valve cells thereon, whereby the image detection means may be scanned at a single site on each individual photodetector but at a plurality of sites in the total photodetector means simultaneously, e.g. by frequency domain multiplexing or surface area muliplexing. In this way the signal to noise ratio is increased.

The photodetector may be a photovoltaic cell, generating a voltage signal response to the impingement of light thereon. Alternatively, the photodetector may be a photoconductor where the signal is, e.g. the voltage drop across the photoconductor for constant current flow therethrough or the current flow therethrough at a constant voltage drop thereacross. When the photodetector is a photoconductor, there may be one photoconductive element or a plurality of photoconductive elements in the device.

The photodetector means is most commonly a photovoltaic cell. It is most commonly formed of deposited amorphous semiconductor alloy materials although it may be formed of polycrystalline or crystalline materials.

The individual light valves may comprise physically separate liquid crystal or electrochromic light valve cells, connected through a common electronic addressing circuit. According to a further exemplification, the individual light valves may be physically separate electrochromic panels, connected through an addressing circuit, or an electrochromic sheet, plate, or film, or a liquid crystal matrix array having individually addressable cell regions thereon.

THE FIGURES

The invention herein contemplated may be particularly understood by reference to the Figures.

FIG. 5 is a partial perspective cut-away view of a graphic art system of the present invention, e.g. an electronic photographic system, having optical imaging means, central processing means, memory means and output means.

DETAILED DESCRIPTION OF THE INVENTION

Figure 1:
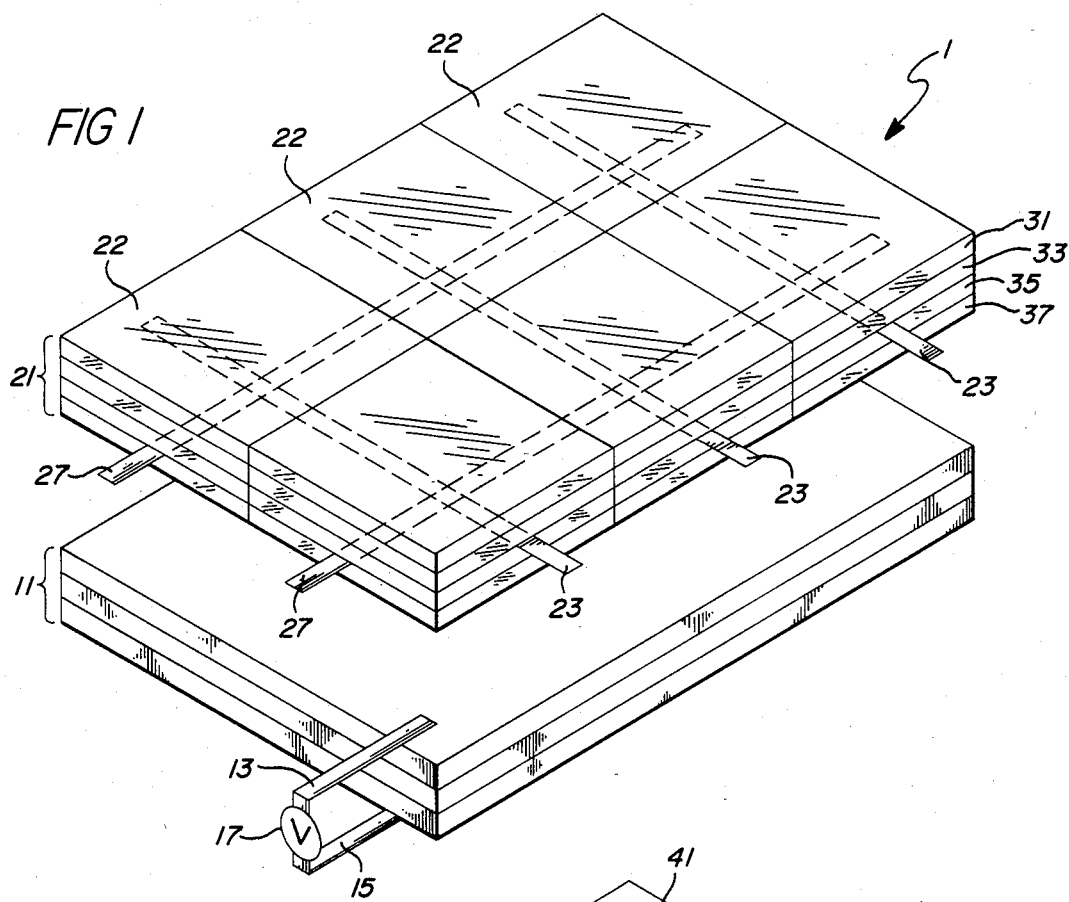
FIG. 1 is a partially exploded isometric view of a 2 element by 3 element liquid crystal matrix light valve means in tandem with and atop a photodetector means of a sensor embodying the present invention.

The invention herein contemplated relates to an imaging means as shown in the Figures. The imaging system 1 has a photodetector means 11, for example, photovoltaic cell, or a photoconductor. In a preferred exemplification, the photodetector 11 is a photovoltaic cell. In a particularly preferred exemplification, the photovoltaic cell 11 is formed of three layers 11a, 11b and 11c of deposited amorphous p-type semiconductor alloy material, deposited amorphous intrinsic semiconductor material, and deposited amorphous n-type semiconductor material, respectively. Across the vertical dimension of the photovoltaic cell 11 are electrodes 13 and 15 and a signal detection means shown schematically as a voltmeter 17.

Alternatively, the photodetector means 11 may be a photoconductor, e.g. a cadmium sulfide photoconductor, a cadmium selenide photoconductor, or the like. When the photodetector is a photoconductor, the signal generated thereby may be a voltage decrease at constant current density, or an increase in current at constant voltage.

Arrayed atop the photodetector means 11, i.e. photovoltaic cell or photoconductor layer, is the matrix light valve means 21 having a plurality of volatile, individual light valve cells 22. The individual light valve cells are addressed by individual column address line 23 and individual row address line 27. When the light valve means is a liquid crystal display matrix, the liquid crystal display matrix has polarizer means 31, a glass sheet 33, a liquid crystal material 35 and a glass sheet 37, as is well known in the art.

Alternatively, the light valve means 21 may contain a plurality of individually addressable electrochromic cells, each cell or region being individually switchable between a light transmitting state and a light blocking state. It is to be understood that when "light transmitting", "light blocking", and "light dispersive" are referred to, these terms may mean that these cells have these properties only with respect to certain wavelengths of light.

Figure 2:
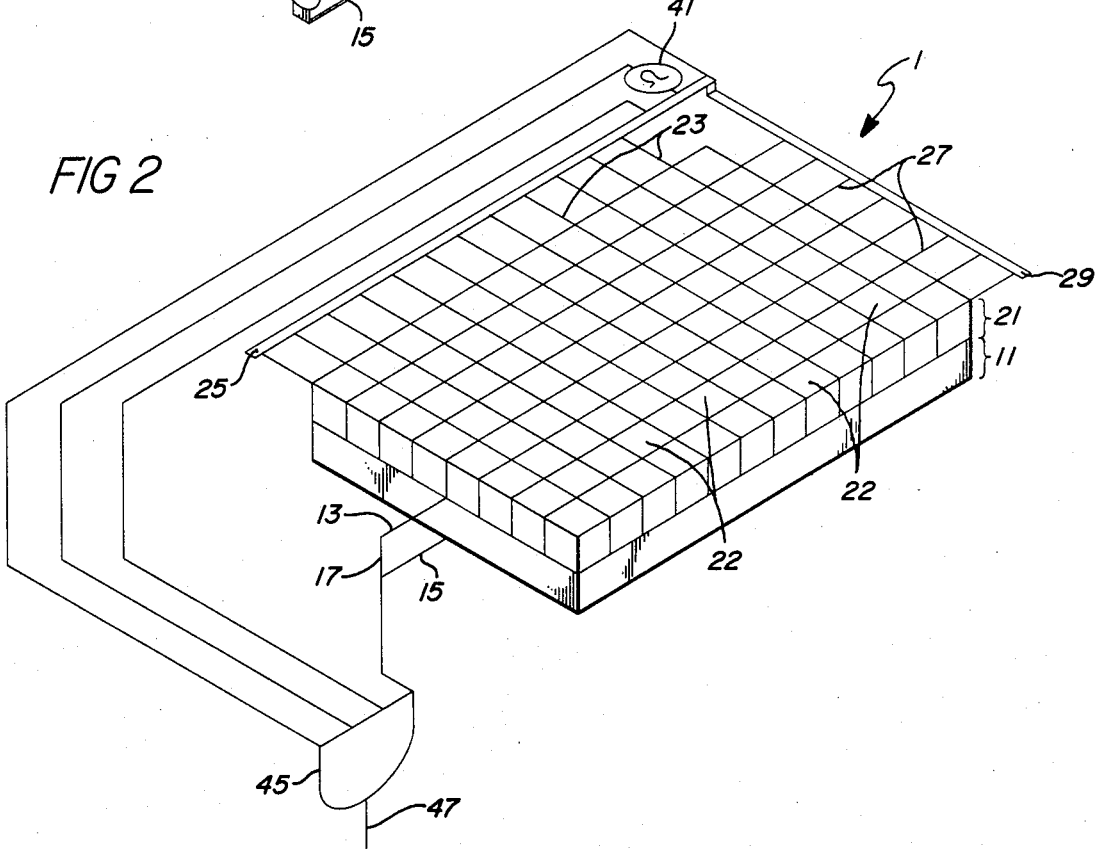
FIG. 2 is an isometric partially schematic view of a photodetector means having thereon a matrix light valve means of the sensor of the present invention.

FIG. 2 shows an 8 element by 12 element, 96 cell light valve matrix 21 having 96 individual light valve cells 22 with a single photovoltaic cell 11. The individual light valve cells 22 are each individually addressed by column address lines 23 through column selection register 25 and individual row address lines 27 through row address register 29. The selection is controlled by a clock 41. Clock time and column and row addresses, respectively, go through column address bus 25, row address bus 29, and clock bus 41 to "matrix address versus photodetector signal" encoding means 45. The output 49 of the "matrix address versus photodetector signal" encoding means 47 further includes the output of the signal detection means 17.

When the photodetector 11 is a photovoltaic cell, it has a thickness of from about 500 to 10,000 angstroms and especially from about 2,400 to about 4,000 angstroms. It may contain a layer 11a of p-type deposited semiconductor alloy material having a thickness of from about 200 to about 800 angstroms, a layer 11b of i-type deposited semiconductor alloy material having a thickness of about 2,000 to about 10,000 angstroms and a layer 11c of n-type deposited amorphous semiconductor material having a thickness of from about 200 to about 800 angstroms. When the photodetector means 11 is a photovoltaic cell, it is typically a deposited distributed structure formed of deposited amorphous semiconductor alloy material as described in U.S. Pat. No. 4,217,374 of Stanford R. Ovshinsky, et al, for AMORPHOUS SEMICONDUCTORS EQUIVALENT TO CRYSTALLINE SEMICONDUCTORS, and U.S. Pat. No. 4,226,898 to Stanford R. Ovshinsky, et al for SEMICONDUCTORS EQUIVALENT TO CRYSTALLINE SEMICONDUCTORS PRODUCED BY A GLOW DISCHARGE PROCESS, the disclosures of which are incorporated herein by reference.

When the light valve matrix 21 is a liquid crystal light valve matrix, the crystal light valve matrix comprises a transparent substrate 37, for example, a glass substrate 37 having a layer film or coating thereon. The layer, film or coating is to provide a desired axis to the liquid crystal material. The layer, film, or coating may additionally or alternatively be a thin metallic coating, for example, an electrode. The electrode may be transparent or reflective. The electrode may be formed of, for example, indium oxide, indium oxide-tin oxide, doped indium oxide, antimony doped tin oxide, vapor deposited aluminum or vapor deposited chromium. Typically the electrode is from about 0.2 to about 20 microns thick.

A second electrode is on the top transparent sheet 33, spaced from the first electrode by about 5 to 50 microns, whereby to provide a thickness of about 5 to 50 microns of liquid crystal material. The liquid crystal material 35 is an organic molecule having the property that when a voltage greater than a threshold voltage is applied across the liquid crystal material 35, the polarization of light through the liquid crystal material is changed. That is, the polarization of light is switched by changing the birefringent-liquid crystal material molecules. Preferably the liquid crystal materials herein contemplated are such that when a field is applied thereacross, polarized light passes therethrough and when no field is applied across the liquid crystal material 35, that is when the voltage thereacross is less than the threshold voltage, light is dispersed.

The second electrode is similarly formed of a transparent material, for example, indium oxide, indium oxide-tin oxide, antimony doped tin oxide, vapor deposited aluminum, or vapor deposited chromium. It is similarly from about 0.05 to about 20 microns thick.

The image detection means herein contemplated is such that the light valve matrix 21 has a higher resolution than the photodetector means 11. That is, an individual light valve cell 22 is smaller than the individual photodetector element 11, with a plurality of light valve cells 22 capable of switchably controlling the passage of light to one photodetector element 11. In this way, a plurality of individual light valve cells 22 may be used in combination with a single photodetector element 11. This necessitates encoding means 45 which relate the signal, that is the output of the signal detection means 17, to the address of the particular individual light valve cell 22 then in a transmissive state causing the signal to be detected at detection means 17.

Figure 3:
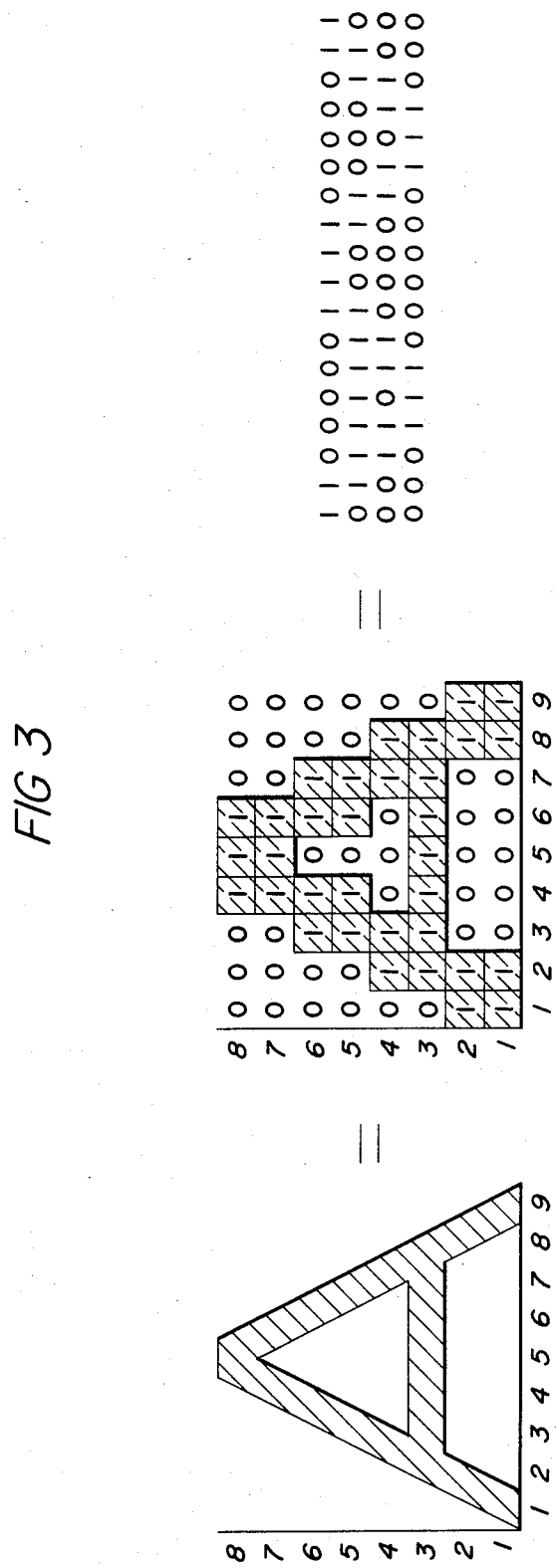
FIG. 3 shows a sequence for converting image input data to digital data using the present invention.

FIG. 3 shows the contemplated encoding algorithm where the letter A is displayed on a 9×8 matrix. Each one of the 72 individual points either has a value of 1, showing shadow, or 0, showing light. These are encoded as a string of 0's and 1's which, in combination with timing circuit, allows decoding of the encoded image and recreation of the letter A.

The ability to decode the encoded image further allows means for switching the image detection means between image detection and image display modes where, a liquid crystal matrix may be used as both a display and, in combination with a photodetector means 11, as an input, for example, in writing with a light pen.

As herein contemplated, an image is detected by forming the image in proximity to a major surface of the matrix light valve means 21. That is, the image may be written on the surface of the combined light valve 21 and display by pen, pencil, felt-tipped marker, template or the like, projected thereon by optical or light pen means, or brought thereon by fiberoptic means. The individually addressable volatile, light valve cells 22 are normally maintained in a non-transmissive state, e.g., either a light blocking or a light dispersive state by the absence of a field thereacross and are sequentially switched from the light blocking or light dispersive state to a light transmissive state by an electrical field through the row and column electrodes whereby to permit generation of a signal by the photodetector means 11 responsive to the transmitted light. The signal is shown as the output 17 of the photodetector means 11. The signal is encoded, as described above, in correspondence a clock signal and/or the address of the individual switched light transmissive individual cell 22. Thereafter the volatile, transmissive light valve cell 22 is switched from the light transmissive state to a light blocking or light dispersive state by removing the field thereacross and a subsequent individual light valve cell 22 is switched from a light blocking or light dispersive state to a light transmissive state by applying a field thereacross.

Figure 4:
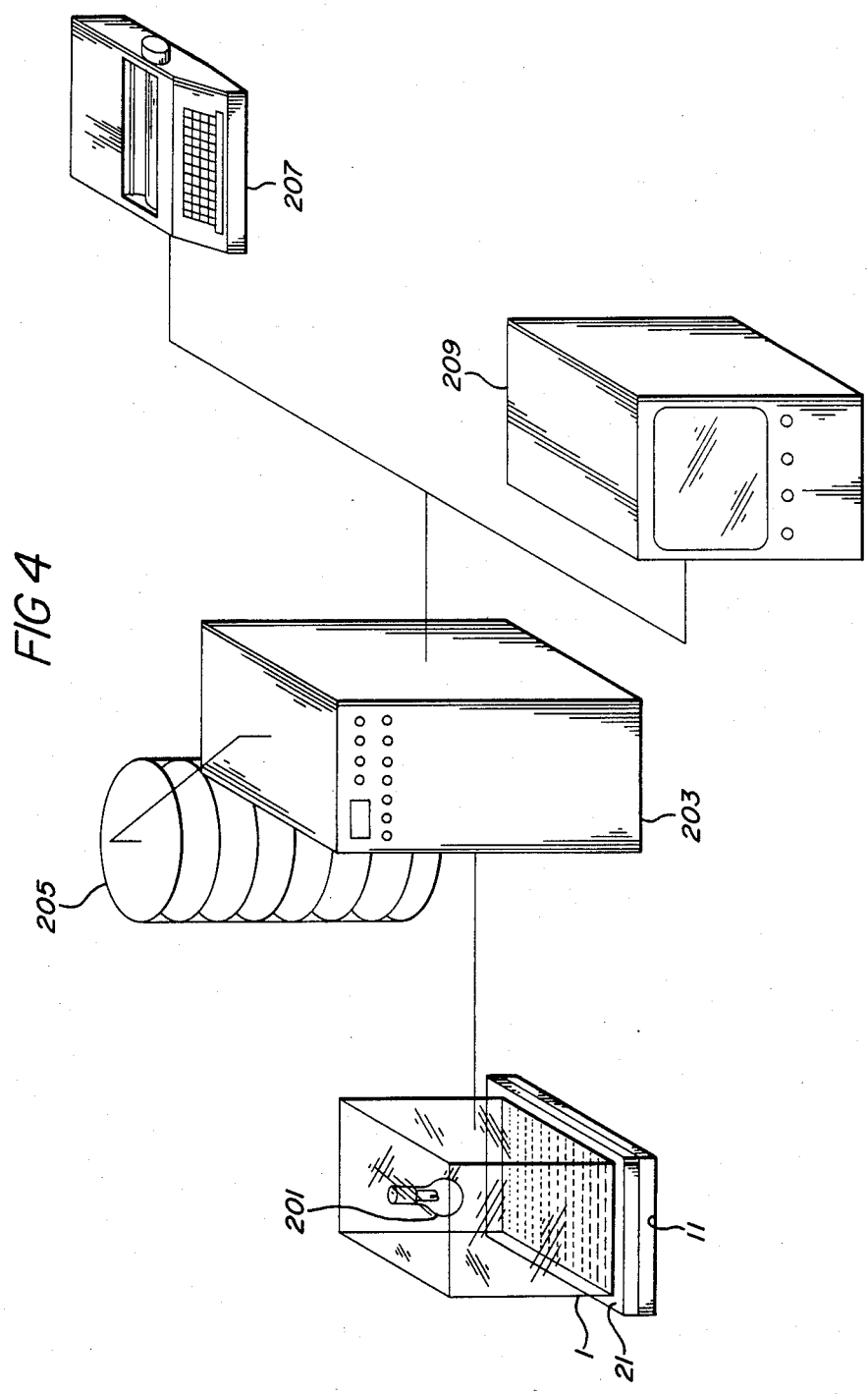
FIG. 4 is a schematic view of an imaging system of the present invention having the optical imaging means herein contemplated, a central processing unit, memory means and output means.

FIG. 4 shows a page scanner for the translation of alphanumeric optical data into binary data utilizing the system of FIGS. 1 and 2 and the algorithm of FIG. 3. The imaging detection system 1 of FIG. 4 includes a photodetector, e.g., a photovoltaic cell 11, and a light valve means 21, e.g., the liquid crystal light valve matrix described above. A light source 201, which may be a continuous or discontinuous light source, provides light which is transmitted through the light portions and absorbed by the dark portions of the page to be imaged. The pattern of light and dark elements is transmitted as a string of binary data from the image detection system 1 to the memory, e.g. to and through a processing unit 203 to the memory means 205. The memory means 205 may be a portion of central processor 203 or a wafer, disk, floppy disk or the like. It may be electronic, magnetic, thermal, optical or the like. The memory 205 may be accessable by output means, for example through central processor 203. Exemplary output devices include, for example, a printer 207, a cathode ray tube display 209 or a liquid crystal display, not shown.

According to an alternative exemplification shown in FIG. 5, a photographic system, e.g., a graphic arts system, still photographic system, motion picture photographic system, or television system 1 may include the photodetector cell 11 and matrix light valve 21 and a lens 199 which focuses the image 200 of the object 197 onto the imaging system 1. The imaging system 1 serves as the input for the conversion of the image 200 to a string of binary data as shown and illustrated above. The string of binary data is processed through a central processing unit 203 and stored in memory, for example, unit 205 with output being, for example, to a cathode ray tube display 209 or a liquid crystal display, not shown.

It has further been found that where the incident light is green light having a wavelength of from about 450 nanometers to about 525 nanometers and the polarizer 31 exhibits a cut-off at wavelength of about 525 nanometers, particularly good response is obtained.

While the invention has been described with respect to certain preferred exemplifications and embodiments thereof, it is not intended to limit the scope of protection thereby but only by the claims appended hereto.

I claim:

1. Image detection means comprising:
   (a) photodetector means for generating a signal responsive to light incident thereon; and
   (b) matrix light valve means having a plurality of individually addressable, volatile, light valve cells, the matrix light valve means being optically and operatively in series with and between the incident light and the photodetector means, electrically insulated from the photodetector means, and having a higher resolution then the photodetector means.

2. The image detection means of claim 1 wherein the photodetector means comprises a photovoltaic cell generating a voltage signal when exposed to light.

3. The image detection means of claim 1 wherein the photodetector means comprises a photoconductor.

4. The image detection means of claim 1 wherein the matrix light valve means is a liquid crystal light valve means.

5. The image detection means of claim 1 wherein the matrix light valve means is an electrochromic light valve means.

6. The image detection means of claim 1 further comprising means for encoding the photodetector means signal versus the individually addressable, volatile light valve cell address.

7. The image detection means of claim 6 further comprising means for decoding the encoded image.

8. The image detection means of claim 7 further comprising means for switching the image detection means between image detection and image display modes.

9. A method of detecting an image with an image detection means comprising photodetector means and light valve means, the light valve means being between the image and the photodetector means, said method comprising the steps of:

(a) forming the image on matrix light valve means formed of a plurality of individually addressable, volatile, light valve cells;
(b) maintaining said individually addressable light valve cells in a non-light transmissive state;
(c) sequentially switching an individual light valve cell from a non-transmissive to a transmissive state whereby to permit generation of a signal responsive to the transmitted light; encoding the signal versus the address of the switched, light transmissive cell; thereafter switching the individual light valve cell from a transmissive state to a non-transmissive state; and
(d) thereafter repeating step (c) at a subsequent individual light valve cell.

10. The method of claim 9 wherein the photodetector is a photovoltaic cell and the signal generated is a voltage signal.

11. The method of claim 9 wherein the photodetector is a photoconductor.

12. The method of claim 9 wherein the matrix light valve means has a higher resolution than the photodetector.

13. The method of claim 9 comprising periodically switching said matrix light valve means and photodetector means to a display means.

14. The method of claim 9 comprising switching said matrix light valve means and photodetector means to a display means, switching said matrix display means to a matrix light valve means and photodetector means, inputting an image, and switching said matrix light valve means and photodetector means to a matrix display means displaying said inputted image.

15. The method of claim 9 wherein the matrix light valve means in a liquid crystal light valve means.

16. The method of claim 9 wherein the matrix light valve means in an electrochromic light valve means.

17. An electronic photographic system comprising:
(a) image focusing means;
(b) image detection means comprising;
  (i) photodetector means generating a signal responsive to incident light thereon; and
  (ii) light valve means having a plurality of individually addressable, volatile light valve cells optically and operatively in series with and between the focused image and the photodetector means, and having a higher resolution then the photodetector means; and
(c) means for storing the signal versus the light valve cell address.

18. The electronic photographic systems of claim 17 wherein the photodetector means comprises a photovoltaic cell generating a voltage signal when exposed to light.

19. The electronic photographic system of claim 17 wherein the photodetector means comprises a photoconductor.

20. The electronic photographic system of claim 17 wherein the light valve means is a liquid crystal light valve means.

21. The electronic photographic system of claim 17 wherein the light valve means is an electrochromic light valve means.

22. A method of electronic photography comprising the steps of:
(a) bringing an image to focus on an image detection means comprising;
  (1) a signal responsive to incident light thereon; and
  (2) light valve means having a plurality of individually addressable, volatile, light valve cells optically and operatively in series with and between the focused image and the photodetector means and having a higher resolution then the photodetector means;
(b) maintaining the individually addressable light valve cells in a non-transmissive state;
(c) sequentially switching an individual light valve cell from a non-transmissive state to a transmissive state whereby to permit generation of a signal responsive to the transmitted light; encoding and storing the signal versus the address of the switched, light transmissive cell; thereafter switching the individual light valve cell from a transmissive state to a non-transmissive state; ;and
(d) thereafter repeating step (c) at a subsequent individual light valve cell.

23. The method of claim 22 comprising scanning the image detection means in a still photographic process.

24. The method of claim 22 comprising scanning the image detection means, and thereafter again scanning the image detection means in a motion picture photographic process.

25. The method of claim 22 wherein the photodetector is a photovoltaic cell and the signal generated in a voltage signal.

26. The method of claim 22 wherein the photodetector is a photoconductor.

27. The method of claim 22 wherein the light valve means is a liquid crystal light valve means.

28. The method of claim 22 wherein the light valve means is an electrochromic light valve means.

29. A data entry and display system comprising:
(a) photodetector means for generating a signal responsive to light incident thereon
(b) matrix light valve means having a plurality of individually addressable cells, the individual cells being switchable between
  (1) a light valve mode of operation having light transmitting and light non-transmitting states; and
  (2) a display mode of operation; said matrix light valve means being optically and operatively between the photodetector means and an incident light, and having a higher resolution then the photodetector means
(c) means for encoding, storing, and decoding the signal versus the individual cell address.

30. The data entry and display system of claim 29 wherein the phnotodetector means comprises a photovoltaic cell generating a voltage signal when exposed to light.

31. The data entry and display system of claim 29 wherein the photodetector means comprises a photoconductor.

32. The data entry and display system of claim 29 wherein the individual cells of the matrix light valve means are liquid crystal cells.

33. The data entry and display system of claim 32 wherein the individual cells are switchable between light transmissive and light dispersive modes.

34. The data entry and display system of claim 29 wherein the individual cells of the matrix light valve means are electrochromic cells.

35. The data entry and display system of claim 34 wherein the individual cells are switchable between light transmissive and light blocking modes.

36. A method of data entry and display with (1) an image detection means comprising photodetector means and matrix light valve means, the light valve means being between the image and the photodetector means and comprising a plurality of individually addressable cells, said cells being switchable between a data entry mode having light transmissive and non-light transmissive modes, and a data display means, and (2) encoding, storage, and decoding means, which method comprises the steps of:

(a) forming the image on the matrix light valve means in a data entry mode;
(b) maintaining the individually addressable cells in a non-light transmissive state;
(c) sequentially switching an individual cell from a non-light transmissive state to a light transmissive state whereby to permit generation of a signal by the photodetector means responsive to incident light thereon; encoding the signal versus the address of the switched, light transmissive cell; thereafter switching the individual light valve cell from a light transmissive state to a non-light transmissive state;
(d) thereafter repeating step (c) at a subsequent individual light valve cell; and
(e) periodically switching said matrix from a data entry mode to a data display mode.

37. The data entry and display method of claim 36 wherein the photodetector means comprises a photovoltaic cell generating a voltage signal when exposed to light.

38. The data entry and display method of claim 36 wherein the photodetector means comprises a photoconductor.

39. The data entry and display method of claim 36 wherein the individual cells of the matrix light valve means are liquid crystal cells.

40. The data entry and display method of claim 39 wherein the individual cells are switchable between light transmissive and light dispersive states modes.

41. The data entry and display method of claim 36 wherein the individual cells of the matrix light valve means are electrochromic cells.

42. The data entry and display method of claim 41 wherein the individual cells are switchable between light transmissive and light blocking modes.

* * * * *